Patented July 27, 1937

2,088,407

UNITED STATES PATENT OFFICE 2,088,407

RUBBER-LIKE MATERIALS AND PROCESS FOR PREPARING SAME

Benton Dales, Chadds Ford, Pa., and Frederick Baxter Downing, Carneys Point, N. J., assignors to E. I. du Pont de Nemours & Company, Wilmington, Del., a corporation of Delaware No Drawing. Application August 8, 1934, Serial No. 738,928

21 Claims. (Cl. 134—26)

This invention relates to aqueous dispersions of natural and artificial rubber and their manufacture. More particularly it relates to the preparation of mixed aqueous dispersions comprising natural rubber and halogen-2-butadiene-1,3 polymer as the dispersed phases. Still more particularly it relates to a method of stabilizing such dispersions. Still more particularly it relates to the use of higher alkyl ester salts as stabilizing agents for such mixed dispersions.

This invention has for an object the preparation of mixed aqueous dispersions of natural rubber and a polymerized addition product of monovinylacetylene and a hydrogen halide. Another object of the invention is the stabilization of such dispersions. Another object of the invention is the stabilization of such dispersions with higher alkyl ester salts. Still another object is the preparation of mixed aqueous dispersions of chloro-2-butadiene-1,3 polymer and natural rubber which are stabilized with higher alkyl sulfate ester salts. A further object is the preparation of mixed aqueous dispersions of chloro-2-butadiene-1,3 polymer and rubber which are stable for long periods. A still further object is the preparation of such mixed dispersions in high concentration. Other objects will appear hereinafter.

Collins has shown in a copending application, Serial No. 537,484, filed May 14th, 1931, now U. S. Patent No. 1,967,861, that an aqueous dispersion of chloro-2-butadiene-1,3 polymer may be added to an aqueous dispersion of natural rubber to give a mixed aqueous dispersion of the two materials, from which a film may be obtained, for example; by evaporation. These mixed dispersions are not stable for very long periods, however, and in addition the method is only with difficulty applied to the preparation of concentrated dispersions.

It has now been found that improved mixed aqueous dispersions of natural rubber and a polymerized addition product of monovinylacetylene and a hydrogen halide may be made by adding to the respective dispersions, additional stabilizing agent before mixing. According to the preferred procedure mixed aqueous dispersions of natural rubber and chloro-2-butadiene-1,3 polymer are prepared by adding to separate dispersions of each a small quantity of an alkali metal salt of a mixture of sulfuric acid esters of normal straight-chain primary aliphatic alcohols, having from 12 to 18 carbon atoms, and then mixing the two dispersions.

The following examples will serve to show the method but they are to be construed as illustrative only. There is no intention to limit the invention to the proportions or to the particular substances given in the examples.

Example 1

To 270 cc. of an aqueous emulsion containing 33% by weight of chloro-2-butadiene-1,3 polymer, 2 cc. of aqueous ammonia (29%) and a solution of 0.5 gram of a mixture of sodium salts of the sulfuric acid esters of higher alcohols (described below) in 3 cc. of water are added. To 25 cc. of rubber latex (36.77% solids) is added a solution of 0.5 gram of sodium salts of the sulfuric acid esters of higher alcohols (described below) in 3 cc. of water. The rubber latex mix may then be poured into the chlorobutadiene emulsion mix with careful stirring. No coagulation will occur. Vulcanized rubber latex may be used instead of natural latex, or the latex may be compounded so it may be subsequently vulcanized.

Example 2

To 200 cc. of an aqueous emulsion containing 45% by weight of chloro-2-butadiene-1,3 polymer are added 4 cc. of aqueous ammonia (29%) and a solution of 1 gram of a mixture of sodium salts of the sulfuric acid esters of higher alcohols (described below) in 6 cc. of water. To 49 cc. of normal rubber latex (36.77% solids) is added a solution of 1 gram of a mixture of sodium salts of the sulfuric acid esters of higher alcohols (described below) in 6 cc. of water. These latex mixes may be poured together, as in Example 1, without coagulation.

Example 3

To 200 cc. of an aqueous emulsion containing 45% by weight of chloro-2-butadiene-1,3 polymer are added 4 cc. of aqueous ammonia (29%) and a solution of 1 gram of a mixture of sodium salts of the sulfuric acid esters of higher alcohols (described below) in 6 cc. of water. To 40 cc. of a 45% whole latex (obtained by dilution, with water, of the standard 75% paste, known to the trade as Revertex) is added a solution of 1 gram of a mixture of sodium salts of the sulfuric acid esters of higher alcohols (described below) in 6 cc. of water. The whole latex mix may be added to the chloro-2-butadiene-1,3 mix as in the other examples without coagulation.

The following example illustrates the use of an alkyl naphthalene sulfonic acid to prepare a dilute mixed latex.

Example 4

To 200 cc. of an aqueous emulsion containing 33% by weight of chloro-2-butadiene-1,3 polymer, 4 cc. of aqueous ammonia (29%) and 5 cc. of a 10% aqueous solution of the sodium salt of isopropyl naphthalene sulfonic acid are added. To 20 cc. of rubber latex (36.77% solids), 5 cc. of the same solution of the sodium salt of isopropyl naphthalene sulfonic acid are added. The rubber latex mix may then be added to the chloro-2-butadiene-1,3 polymer mix as in the other examples without coagulation.

The mixture of sodium salts of sulfuric acid esters of higher alcohols used in the above examples may be prepared by hydrogenating coconut oil to reduce the carboxyl groups to alcohol groups, in a manner described in the art and then sulfating the mixture of alcohols so obtained by treating them with chloro-sulfonic acid at a temperature of from 0 to 30° C., after which the mixture of sulfuric acid esters of higher alcohols, principally lauryl but also containing other alcohols having from 8 to 18 carbons atoms, for example, oleyl and stearyl, is neutralized with sodium hydroxide.

While thus far this invention has been described with particular reference to the preparation of mixed aqueous latices comprising chloro-2-butadiene-1,3 polymer and rubber, it is to be understood that the invention includes within its scope the preparation of mixed latices comprising other synthetic rubbers. Polymers of any of the addition products of monovinylacetylene and the hydrogen halides may be substituted for the chloro-2-butadiene-1,3 polymer in the above description. The preparation of these addition products is described in U. S. Letters Patent, #1,950,431 to Wallace H. Carothers and Arnold M. Collins.

Thus far chloro-2-butadiene-1,3 and bromo-2-butadiene-1,3 appear to operate more satisfactorily than the others in the process of the present invention and of these latter two, the chloro-derivative is to be preferred for various reasons.

The preparation of aqueous dispersions of the polymers of the monovinylacetylene-hydrogen halide addition products, described above, is discussed in Collins' application, hereinbefore identified. Any of these polymer dispersions may be used in the process of the present invention.

It is apparent from the above examples that the concentration of the rubber latex as well as the concentration of the chlorobutadiene polymer latex which are to be used as starting materials will vary within rather wide limits. The concentration which may be used depends not only upon the stabilizer which is employed but also upon the viscosity of the rubber latex. The rubber latex whether natural or concentrated must be distinctly fluid. Rubber latices of as high as 60% solids content have been mixed with aqueous emulsions of chloro-2-butadiene-1,3 polymer, containing as much as 45% solids. Even higher concentrations may be used, but, the difficulties encountered in attempting to prepare stable dispersions increase rapidly as the concentration of the starting dispersions is increased. Preferred concentrations for both latices, are from 30 to 45% solids. It is to be noted that wherever throughout the specification and claims the term "rubber latex" is used, it is intended that it shall include within its scope both the natural latex and also that prepared by artificially dispersing rubber.

In the preparation of these mixed latices proper stabilization is very important, for unless proper stabilizers are added in sufficient proportions coagulation ensues upon mixing or soon thereafter. Additional stabilizer over that necessary to keep either of the components of the mixed latex in a dispersed condition when separate is required to keep them dispersed for a satisfactory length of time after mixing. As the concentrations of the starting dispersions are increased, the amount of stabilizer which must be added increases.

Thus far only two types of stabilizers have been described. One of these types, the sulfate ester salt, is the preferred stabilizer. In its broad scope, however, the invention includes the use of any of the well known emulsifying agents as stabilizers. These will include the sulfate, phosphate or borate ester salts, more fully described below, the salts of the alkyl naphthalene sulfonic acids and sodium and potassium soaps as well as many others. The emulsifying agent or stabilizer added need not be the same as that already present in the latex.

The ester salts mentioned above will include any soluble salt of a sulfuric, phosphoric or boric acid ester of a normal straight-chain primary aliphatic alcohol having from 8 to 18 carbon atoms or any mixture of such salts in the proportions in which the long chain acids occur naturally, or in any other proportions. These ester salts may in addition have substituted in them sulfonic acid groups or acetate groups. These compounds may be prepared, for example, by hydrogenation of a fatty acid or a fatty acid ester or a mixture of fatty acids or fatty acid esters, in a manner described in the art, to produce alcohols. These alcohols are then treated, for example, with fuming sulfuric acid or chloro-sulfonic acid at from 0 to 30° C., after which the resulting sulfate esters are treated with, for example, sodium hydroxide or soda ash, whereby they are neutralized to form the salts. Thus far the alkali metal salts of the sulfuric acid esters of the normal straight-chain primary aliphatic alcohols, having from 12 to 18 carbon atoms, appear to have the most desirable properties.

The amounts of the sulfate ester salts which will be added to the respective emulsions before mixing them will be about five-tenths of a percent by weight added to the chloro-2-butadiene-1,3 polymer emulsion and about 5% by weight added to the rubber. As is apparent from these specific proportions, in general, considerably more stabilizer must be added to the rubber dispersion than is added to the chloro-2-butadiene-1,3 polymer dispersion. It will be understood, however, that proportions other than the above may be used, depending somewhat on the concentration of the separate dispersions employed. While only the alkali metal salts of the sulfate esters have been mentioned in the discussion of proportions it will be understood that the invention is not intended to be limited thereby. The amounts of the other dispersing agents will likewise vary. The variations in amount with the nature of the stabilizer and the concentration of the latices are illustrated by the examples. In general the examples show an amount closer to the minimum than the maximum. It is to be noted that larger amounts of stabilizer can be used but that ordinarily they are unnecessary. The proportions of the other stabilizers to be used will correspond, however, to those given for the alkali metal salts of the sulfate esters.

The latter have been found to be most effective on a weight basis. Closely corresponding to these are the other ester salts and the alkyl naphthalene sulfonic acids. Soaps are less effective.

As will be noted from the specific amounts given, usually about ten times as much stabilizer, on a weight basis, is added to the rubber as is added to the halogen-butadiene polymer.

The addition of rubber dispersions to chloro-2-butadiene-1,3 polymer dispersions gives some very valuable properties to the films deposited from the mixture as compared with those chlorobutadiene polymer dispersions to which the rubber dispersions have not been added.

The film is softer. This is true whether the rubber dispersion is natural latex, vulcanized latex or an artificial latex and with any amount of rubber, however small.

The film has less tendency to "freeze" at lowered temperatures or on standing at ordinary temperatures. If the rubber comes from vulcanized latex the inhibiting effect will prevail to lower temperatures than if the rubber is from unvulcanized dispersions because a much lower temperature is required to freeze vulcanized rubber than unvulcanized.

The above changes in properties are brought about with disproportionately small changes in the other characteristic properties of the chlorobutadiene polymer dispersion. Small amounts (10–20%) of rubber, calculated on the chlorobutadiene polymer, have almost no effect on the tensile strength, resistance to tear, fatigue, water absorption or permeability to gases of a regular chlorobutadiene polymer dispersion film. Even the oil absorption and the stability at higher than ordinary temperatures of the regular chlorobutadiene polymer dispersion film suffer very little.

Amounts of rubber (in the form of latex, of course) up to 1 part for 2 parts of chlorobutadiene polymer dispersion will yield a film from the mixture which is more like chlorobutadiene polymer in its appearance and properties than it is like rubber. The film will be thinner than one from chlorobutadiene polymer dispersion alone of equivalent concentration; this and its softness will be the only visible evidences of the rubber. Rubber, as latex, makes therefore a useful compounding ingredient for chlorobutadiene polymer dispersions.

By the process of this invention it is possible to prepare quite stable mixed aqueous dispersions of natural rubber and halogen-butadiene polymer. It is also possible to prepare stable mixed dispersions of the type described in much higher concentration.

It will be apparent that many widely different embodiments of this invention may be made without departing from the spirit and scope thereof, therefore, this invention is not intended to be limited except as indicated in the appended claims.

We claim:

1. An aqueous dispersion comprising an admixture of a dispersion of rubber and a dispersion of a polymer of chloro-2-butadiene-1,3, a substantial amount of a water soluble salt of a sulfuric acid ester of a normal straight-chain primary aliphatic alcohol having from 8 to 18 carbon atoms being present in addition to the amounts of emulsifying agent required to maintain stable the separate dispersions.

2. A process for preparing mixed aqueous dispersions of rubber and a polymer of chloro-2-butadiene-1,3 which comprises adding to separate stable aqueous dispersions of the two substances a small amount of a water soluble salt of a polyhydric inorganic acid ester of a normal straight-chain primary aliphatic alcohol having from 8 to 18 carbon atoms and then mixing the two resulting dispersions.

3. A process for preparing mixed aqueous dispersions of rubber and a polymer of chloro-2-butadiene-1,3, which comprises adding to separate stable aqueous dispersions of the two substances a small amount of a water soluble salt of a sulfuric acid ester of a normal straight-chain primary aliphatic alcohol having from 8 to 18 carbon atoms and then mixing the two resulting dispersions.

4. A process for preparing mixed aqueous dispersions of rubber and chloro-2-butadiene-1,3 polymer, which comprises adding at least .5% by weight, of ammonia, based on the polymer, adding approximately .5% by weight, based on the polymer, of a water soluble salt of a sulfuric acid ester of a normal straight-chain primary aliphatic alcohol having from 8 to 18 carbon atoms, to a stable aqueous alkaline chloro-2-butadiene-1,3 polymer dispersion, adding to a stable rubber latex approximately 5%, by weight, based on the rubber, of a water soluble salt of a sulfuric acid ester of a normal straight-chain primary aliphatic alcohol having from 8 to 18 carbon atoms, and then mixing the two resulting dispersions.

5. A process for preparing mixed aqueous dispersions of rubber and a chloro-2-butadiene-1,3 polymer which comprises adding at least .5%, by weight, of ammonia, based on the polymer, and approximately .5% by weight, based on the polymer, of an alkali metal salt of a sulfuric acid ester of a normal straight-chain primary aliphatic alcohol having from 12 to 18 carbon atoms to a stable aqueous alkaline chloro-2-butadiene 1,3 polymer dispersion; adding to a stable rubber latex approximately 5%, by weight based on the rubber, of an alkali metal salt of a sulfuric acid ester of a normal straight-chain primary aliphatic alcohol having from 12 to 18 carbon atoms and then mixing the two resulting dispersions.

6. An aqueous ammoniacal dispersion comprising an admixture of an ammoniacal dispersion of rubber and an ammoniacal dispersion of chloro-2-butadiene-1,3 polymer, said mixed dispersion contining an alkali metal salt of a sulfuric acid ester of a normal straight-chain primary aliphatic alcohol having from 12 to 18 carbon atoms as an emulsifying agent said ester salt being present in an amount at least equal to the total amount required to maintain stable the separate dispersions plus an amount equal to about 0.5 of 1% of the weight of polymer present and about 5% of the weight of the rubber present.

7. A product as described in claim 6 further characterized in that the total concentration of rubber and polymer is 30 to 45%.

8. A product as described in claim 6 further characterized in that the total concentration of rubber and polymer is 30 to 45% and in that the ratio of the amount of rubber present to the amount of polymer present is ½ to 1/10.

9. A process as described in claim 5 further characterized in that the total concentration of rubber and polymer is 30 to 45%.

10. A process as described in claim 5 further characterized in that the total concentration of rubber and polymer is 30 to 45% and in that the ratio of the amount of rubber to the amount of polymer in the resulting dispersion is ½ to 1/10.

11. A process for preparing mixed aqueous dispersions of rubber and chloro-2-butadiene-1,3 polymer, which comprises adding to separate stable aqueous dispersions of the two substances a small amount of a water soluble salt of a sulfuric acid ester of a normal straight-chain primary aliphatic alcohol having from 12 to 18 carbon atoms and then mixing the two resulting dispersions.

12. A process for preparing mixed aqueous ammoniacal dispersions of rubber and chloro-2-butadiene-1,3 polymer, which comprises adding to separate stable aqueous ammoniacal dispersions of the two substances a small amount of a water soluble salt of a sulfuric acid ester of a normal straight-chain primary aliphatic alcohol having from 12 to 18 carbon atoms and then mixing the two resulting dispersions.

13. A process for preparing mixed aqueous dispersions of rubber and chloro-2-butadiene-1,3 polymer, which comprises adding approximately 0.5%, by weight, based on the polymer, of a water soluble salt of a sulfuric acid ester of a normal straight-chain primary aliphatic alcohol having from 12 to 18 carbon atoms to a stable aqueous alkaline chloro-2-butadiene-1,3 polymer dispersion, adding to a stable alkaline rubber latex approximately 5%, by weight, based on the rubber, of a water soluble salt of a sulfuric acid ester of a normal straight-chain primary aliphatic alcohol having from 12 to 18 carbon atoms, and then mixing the two resulting dispersions.

14. The process which comprises adding to a stable aqueous alkaline emulsion containing 33%, by weight, of chloro-2-butadiene-1,3 polymer, for each 270 cc. of the emulsion, about 2 cc. of aqueous ammonia of 29% concentration and a solution of about 0.5 gram, in about 3 cc. of water, of a mixture of sodium salts of the sulfuric acid esters of a mixture of alcohols obtainable by hydrogenating coconut oil to reduce the carboxyl groups to alcohol groups and separately adding to a stable alkaline rubber latex containing about 36.77% solids, for each 25 cc. of the latex, a solution of about 0.5 gram, in about 3 cc. of water, of the same mixture of sodium salts and then pouring the rubber latex mix into the chlorobutadiene emulsion mix with careful stirring and in such amount that, on the basis of the starting emulsion and the rubber latex before the addition, there are 25 cc. of rubber latex for each 270 cc. of chlorobutadiene polymer emulsion.

15. The process which comprises adding to a stable aqueous alkaline emulsion containing 45%, by weight, of chloro-2-butadiene-1,3 polymer, for each 200 cc. of the emulsion, about 4 cc. of aqueous ammonia of 29% concentration and a solution of about 1 gram, in about 6 cc. of water, of a mixture of sodium salts of the sulfuric acid esters of a mixture of alcohols obtainable by hydrogenating coconut oil to reduce the carboxyl groups to alcohol groups and separately adding to a stable alkaline rubber latex containing about 45%, by weight, of solids, for each 40 cc. of the latex, a solution of about 1 gram, in about 6 cc. of water, of the same mixture of sodium salts and then pouring the rubber latex mix into the chlorobutadiene emulsion mix with careful stirring and in such amount that, on the basis of the starting emulsion and the rubber latex before the addition, there are 40 cc. of rubber latex for each 270 cc. of chlorobutadiene polymer emulsion.

16. An aqueous ammoniacal dispersion comprising an admixture of an ammoniacal dispersion of rubber and an ammoniacal dispersion of a polymer of chloro-2-butadiene-1,3, said admixture containing in addition to the amount of emulsifying agent required to maintain stable the separate dispersions, a small amount of a mixture of sodium salts of the sulfuric acid esters of a mixture of alcohols obtainable by hydrogenating coconut oil to reduce the carboxyl groups to alcohol groups.

17. An aqueous ammoniacal dispersion comprising an admixture of an ammoniacal dispersion of rubber and an ammoniacal dispersion of chloro-2-butadiene-1,3 polymer, said mixed dispersion comprising in addition to the amounts of emulsifying agents required to maintain stable the sepaarte dispersions, an amount of a mixture of sodium salts of the sulfuric acid esters of a mixture of alcohols, obtainable by hydrogenating coconut oil to reduce the carboxyl groups to alcohol groups, which is equal to about 0.5 of 1% of the weight of polymer present plus about 5% of the weight of the rubber present.

18. A product as described in claim 17 further characterized in that the total concentration of rubber and polymer is 30 to 45% and in that the ratio of the amount of rubber present to the amount of polymer present is ½ to 1/10.

19. A process for preparing mixed aqueous ammoniacal dispersions of rubber and chloro-2-butadiene-1,3 polymer, which comprises adding to separate stable aqueous ammoniacal dispersions of the two substances a small amount of a mixture of sodium salts of the sulfuric acid esters of a mixture of alcohols obtainable by hydrogenating coconut oil to reduce the carboxyl groups to alcohol groups and then mixing the two resulting dispersions.

20. A process for preparing mixed aqueous ammoniacal dispersions of rubber and chloro-2-butadiene-1,3 polymer, which comprises adding approximately 0.5%, by weight, based on the polymer, of a mixture of sodium salts of the sulfuric acid esters of a mixture of alcohols, obtainable by hydrogenating coconut oil to reduce the carboxyl groups to alcohol groups, to a stable aqueous ammoniacal chloro-2-butadiene-1,3 polymer dispersion, and adding to a stable alkaline rubber latex approximately 5%, by weight, based on the rubber, of a mixture of sodium salts of the sulfuric acid esters of a mixture of alcohols, obtainable by hydrogenating coconut oil to reduce the carboxyl groups to alcohol groups, and then mixing the two resulting dispersions.

21. A process as described in claim 20 further characterized in that the concentration of polymer in the polymer dispersion and the concentration of rubber in the rubber latex are each in the range of 30 to 45%, and in that the two dispersions are mixed in such proportions that the ratio of the amount of rubber present to the amount of polymer present in the admixture is ½ to 1/10.

FREDERICK BAXTER DOWNING.
BENTON DALES.